United States Patent [19]

Granberg

[11] 4,002,089
[45] Jan. 11, 1977

[54] ADJUSTMENT MEANS

[76] Inventor: Elof Granberg, 530 Canal St. 1A, San Rafael, Calif. 94901

[22] Filed: Dec. 9, 1974

[21] Appl. No.: 531,106

Related U.S. Application Data

[63] Continuation of Ser. No. 305,447, Nov. 10, 1972, abandoned.

[52] U.S. Cl. .................... 76/37; 51/170 PT; 76/25 A
[51] Int. Cl.² ................................. B23D 63/16
[58] Field of Search ....... 51/170 PT, 241 G, 241 S; 76/25 A, 37

[56] References Cited

UNITED STATES PATENTS

| 2,073,861 | 3/1937 | Wolf | 51/170 PT |
| 2,430,984 | 11/1947 | Hopkins | 51/170 PT X |
| 3,354,753 | 11/1967 | Kennemore | 76/37 |

FOREIGN PATENTS OR APPLICATIONS 1,267,431   6/1961   France ............... 51/170 PT Primary Examiner—Harold D. Whitehead
Attorney, Agent, or Firm—Bruce & McCoy

[57] ABSTRACT

An adjustment plate is mounted on the shaped front portion of a motorized grinder used to sharpen a saw chain. The plate extends from the grinder to a position adjacent the grinding element whereby when the plate and grinding element are placed on a saw chain, the plate may be adjusted with respect to the grinder and the saw chain to enable different saw chain cutting links to be sharpened or the depth gauge portion thereof to be ground by different size grinding elements.

5 Claims, 3 Drawing Figures

ADJUSTMENT MEANS

This is a continuation of application Ser. No. 305,447, filed Nov. 10, 1972, now abandoned.

BACKGROUND OF THE INVENTION

1. Field of the Invention

This application relates generally to grinding means for sharpening the cutting links of saw chains, and more particularly, to a motorized grinder having an adjustable plate means mounted thereon for proper positioning of the grinding element with respect to the cutting links of the saw chain.

2. Description of the Prior Art

Many types of sharpeners for saw chains are presently available including motorized grinders of the type set forth in applicant's co-pending U.S. Pat. application Ser. No. 156,859 filed June 25, 1971, for GRINDING APPARATUS AND METHOD and now U.S. Pat. No. 3,738,200 issued June 12, 1973. This co-pending application discloses one type of motorized grinder for sharpening different saw chain cutting links. The grinder includes a motor nested within a frame portion whereby hand holding means are formed extending from both ends of the motor. The frame portion includes an indicating means for aligning the grinder at the proper sharpening angle. A plate is pivotably mounted on the indicating means for adjusting the position of the grinder with respect to the saw chain. However, the adjusting means is limited in operation, and cannot be easily removed from the frame.

The present invention provides an adjustment plate means for mounting on a motorized grinder. The plate is readily adjustable with respect to the grinder and may be removed therefrom. The plate allows the grinder to be used with different size rotary bits, for sharpening different cutter links, and to enable the depth gauge portion of the cutter links to be ground to a predetermined height.

SUMMARY OF THE INVENTION

The present invention comprises an adjustment plate for mounting on a saw chain sharpener comprising a holding portion releasably secured to the sharpener adjacent the rotary grinder bit thereof. A guide portion is fixed to the holding portion of the plate and extends therefrom at an angle whereby it rests in a position parallel to the rotary element of the grinder to guide the sharpener during the sharpening of different types of saw chain cutting links.

The plate may also be used in conjunction with a depth gauge plate to grind the depth gauge portion of the cutter links to predetermined heights.

OBJECTS OF THE INVENTION

It is therefore an object of the instant invention to provide an adjustment means for a saw chain sharpener.

It is another object of the present invention to provide a saw chain sharpener with a low cost, simple means for adjusting the grinder with respect to a saw chain to be sharpened.

It is a further object of the invention to provide a saw chain sharpener with an adjustment means having scale means located thereon whereby grinding bits of different diameters may be used to sharpen the cutting links of a saw chain.

It is still another object of the instant invention to provide a saw chain grinder with means for easily adjusting the height of the grinder relative to a saw chain for sharpening different cutting links.

It is still a further object of the present invention to provide a saw chain grinder with a height adjustment means capable of holding a depth gauge guide whereby the depth gauge portions of the cutting links of a saw chain may be ground to a predetermined height.

It is yet another object of the invention to provide a saw chain height adjustment means with different indicia means to enable the adjustment means to be properly aligned with respect to different size rotary bits.

And it is yet another object of the instant invention to provide a saw chain grinder with a combination height and depth gauge adjustment means which may be easily mounted on and removed from the grinder.

DESCRIPTION OF THE DRAWINGS

Additional objects of the invention will be brought out in the following description of the preferred embodiment of the grinder, taken in conjunction with the accompanying drawings, wherein.

DESCRIPTION OF THE PREFERRED EMBODIMENT

Reference is made to the drawings for the details of the present invention in its preferred form. The present invention provides a novel combination adjustment means for mounting on a motorized grinder. With the adjustment means of the invention in position, a motorized grinder may be provide with different diameter rotating elements. The adjustment means may then be aligned with indicia marked on the adjustment means and the grinder to enable the cutting portions of the cutting link of a chain to be properly sharpened, or the depth gauge of the cutting link to be ground to a predetermined height.

Figure 1:
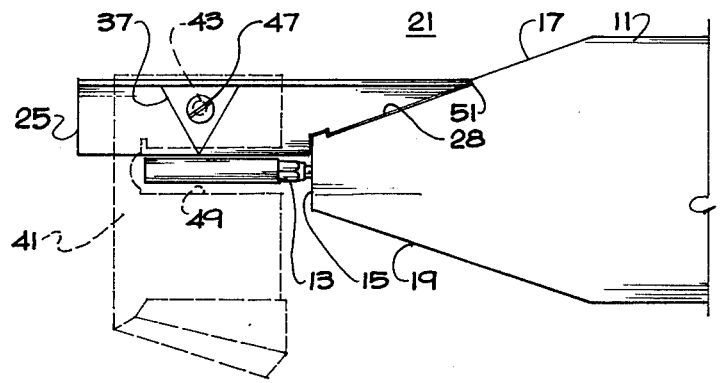
FIG. 1 a top plan view of a preferred embodiment of the adjustment means of the present invention.

Referring now to the drawings, FIG. 1 shows a preferred embodiment of the attachment means of the present invention. The grinder includes a body 11 having an internal drive means (not shown) for a rotary grinding bit or element 13 extending from the face or front portion 15 thereof. In the preferred embodiment of the invention, the body 11 is circular and the front portion 15 is an elongated substantially flat rectangular section with the grinding element mounted substantially centrally of the top portion thereof. The flat front portion is shown as being formed by providing the forward portion of the body with sides 17, 19 which commence at the circular portion of the body and slant or taper inwardly toward face 15. In this manner the front of the body is substantially wedge shape.

The grinder is provided with an adjustable plate means 21 secured to one of the tapering side portions, by any appropriate means, such as a set screw 23 passing through a hole or slot 29 formed in the plate and threadably held within a hole (not shown) in the body 11.

Plate 21 includes two separate portions 25, 27. In the preferred embodiment of applicant's invention, the plate 21 is formed by utilizing a piece of metal having a base 25 and a shorter leg 27 extending therefrom at an angle. The piece of metal is folded along a diagonal line 28 extending between the corners of the mating inner and outer portions. In this manner, when the portions are folded along the diagonal line 28, they will lie in planes which are substantially perpendicular to each other. However, since the portions are formed by folding the plate along the diagonal line, the planes in which they lie will have an included angle formed therebetween approximately equal to the angle of the tapering side portions.

In the folded position, the plate is mounted on the grinder with the wider or holding portion 27 thereof in the vertical position against one of the tapered sides. The longer, narrower guide portion 25 is shown as extending away from the motorized grinder in the horizontal direction.

The vertically extending holding portion 27 is releasably mounted in the grinder by means of the set screw 23 passing through the slotted opening 29. In this manner, the entire plate may be vertically adjusted by merely loosening the screw.

Figure 2:
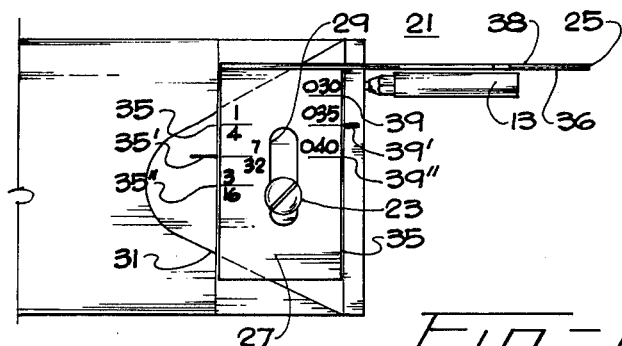
FIG. 2 is a side elevation view of the adjustment means mounted on the grinder of FIG. 1.
Figure 3:
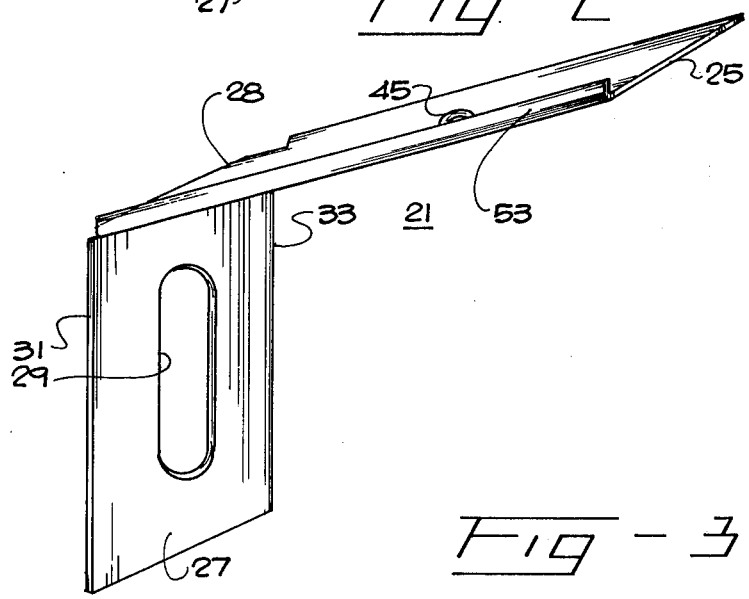
FIG. 3 is a perspective view of the adjustment means removed from the grinder.

As shown more clearly in FIG. 2, the holding portion of the plate is provided with indicia or scale means on each of its parallel side edges 31, 33. The first side edge 31 is provided with spaced indicia or scale means marked with the numbers ¼, 7/32, 3/16, etc. These numbers correspond to the diameters of the grinding elements 13 which may be used with the grinder. That is, when a ¼ inch grinding element is inserted into the grinder the set screw is loosened and the ¼ indicating mark is aligned with an adjacent indicia means or mark 35 formed on the housing of the grinder. The set screw 23 is then tightened to lock the plate on the grinder. Due to the size and shape of the plate, the horizontal guiding portion thereof will rest in a position which is substantially parallel to the grinding bit 13 to enable the grinder to be used to sharpen a cutting link of a saw chain.

That is, when locked in this position, the bottom face 36 of the guiding portion rests upon the top of the cutting link to be sharpened. The grinding element 13 is then aligned with the cutting edge of the link being sharpened by the utilization of one of the angular lines 37 formed on the top face 38 of the guiding portion.

The body 11 of the grinder is provided with further indicia or marks 35', 35'', etc. which are alignable with the corresponding mark indicated as 7/32, 3/16, etc. on the side edge 31 of holding portion 27. It therefore can be seen that any diameter grinding element 13 may be inserted into the grinder, and by simply aligning the correct indicia or scale means, the guide portion of the adjustment plate will be properly adjusted with respect to the grinding element. The cutting edges of the different types of cutting links of a saw chain may then be sharpened to the proper angle.

The other side edge 33 of the holding portion is also provided with indicia or scale means having three or more marks indicated as representing 0.030 inch, 0.035 inch, 0.040 inch, etc. These marks are further alignable with marks 39, 39', 39'' formed on the grinder. These indicia are used when the guide portion is provided with a depth gauge attachment means 41, of the type disclosed in applicant's copending U.S. application filed concurrently herewith. With the depth gauge attachment (shown in phantom line in FIG. 1) in position, the height to which the cutting gauge portion of a cutter link is to be ground may also be adjustably determined by aligning the indicated marks in a manner similar to that set forth above.

The depth gauge attachment is secured to the guide portion 25 by means of a threaded stud 43 passing through a hole 45 formed in the guide, and secured thereto by means of a nut 47 threaded over the end of the stud. The depth gauge attachment includes a centrally removed portion 49 alignable with the grinding element 13 and adjustable with respect thereto by movement of the plate 21 with respect to the grinder. The depth gauge attachment includes and upwardly extending edge portion (not shown) which coacts with an upturned edge 53 formed on the plate to prevent undesired movement of the attachment. In this manner, the amount the rotating element 13 extends through the depth gauge 41 is adjustable to enable the motorized grinder to sequentially grind the cutter gauges of the cutter links on a saw chain.

As shown more clearly in FIGS. 1 and 2, the holding portion 27 of plate 21 is preferably guided within a vertical groove 51 formed in the slanted side 17 of the motorized grinder. This groove guides the sides of the holding portion, and provides raised side edge portions upon which the markings 35 and 39 may be conveniently provided for proper alignment with the scale markings on the side edges of plate portion 27.

It therefore can be seen that an important advantage of applicant's invention is the provision of an adjustment means comprising guiding and holding portions which are adjustable with respect to the grinder. The plate and grinder are provided with indicia or scale means alignable with each other to enable the grinder to be used with different diameter grinding bits.

In addition, the alignable scale means enables the grinder to properly sharpen different types and varieties of cutting edges on saw chain cutting links, as well as grinding the cutting gauges of the cutter links to adjustably predetermined heights.

While the invention has been described in considerable detail, it is not to be limited to such details as have been set forth except as may be necessitated by the appended claims.

I claim:

1. An adjustment plate for mounting on a saw chain sharpener having a rotary grinding element, said plate comprising
    a holding portion releasably secured to the body of said sharpener, said holding portion having means for laterally adjusting said plate with respect to said sharpener body, and
    a planar guide portion fixed to said holding portion and extending generally perpendicularly therefrom beyond the end of said sharpener body, said planar guide portion being disposed substantially perpendicular to the direction of said lateral movement of said plate and closely parallel to said grinding element, the bottom edge of said planar guide portion being spaced slightly above the outer diameter of said grinding element such that, by laterally adjusting said holding portion with respect to said body, the flat guiding surface of said planar guide portion can be adjusted relative to the axis of said grinding element to control the contact of said element with the cutting edge of different types and sizes of saw chain teeth supported on said guiding surface, said holding portion including indicia means for alignment with further indicia means on the body of said sharpener to enable said guide portion of said plate to be adjusted with respect to different diameter grinding elements for sharpening different types and sizes of saw chain cutting teeth said guide portion including a depth gauge attachment detachably secured thereto and extending therefrom, and said holding portion includes further indicia means to enable said holding plate portion to be adjusted with respect to said grinder, whereby, when the depth gauge attachment means is secured to said guide portion the cutter gauge portion of the cutter links of a saw chain may be adjustably ground.

2. The adjustment plate of claim 1 wherein said holding portion includes a slotted opening having a set screw extending therethrough whereby said plate may be adjustably mounted on the side of a motorized grinder.

3. The adjustment plate of claim 1 wherein said holding and guiding portions lie in planes extending at substantially 90° to each other, said holding portion being angled with respect to said grinding portion to allow said holding portion to be attached to a tapered portion of a motorized grinder, with said guiding portion extending from said motorized grinder in a horizontal position substantially parallel to the rotary grinding element thereof.

4. A motorized saw chain sharpener having a rotary grinding element comprising an inwardly slanting substantially V-shaped front portion;

an angled plate releasably and adjustably mounted on one side of said V-shaped front portion within a groove formed thereon, said plate including a vertically extending holding portion formed parallel to the side of said shaped front portion and a horizontally extending guide portion formed in a plane which is substantially perpendicular to a plane passing through said holding portion and at angle with respect thereto whereby said guide portion extends from said V-shaped front portion in a position substantially parallel to said grinding element, said holding portion having separate indicia means formed on opposite edge portions thereof, and capable of being aligned with further scale means formed on the side edges of said groove, whereby, said plate may be adjusted with respect to said grinder to enable the cutting edge of different size saw chain cutting links to be sharpended by different size bits.

5. The motorized saw chain sharpener of claim 4 wherein said guide portion is provided with a depth gauge adjustment secured thereto, and said holding portion is provided with further indicia means alignable with further indicia means on said motorized grinder to enable the cutting gauge of a saw chain cutting link to be ground to an adjustable predetermined height.

* * * * *